TIME DOMAIN EQUALIZER USING ANALOG SHIFT REGISTER

Filed Oct. 10, 1966 2 Sheets-Sheet 1

INVENTOR.
HUGH F. FROHBACH
BY Samuel Lindenberg
Arthur Freilich
ATTORNEYS

INVENTOR.
HUGH F. FROHBACH
BY Samuel Lindenberg
Arthur Frilich
ATTORNEYS

United States Patent Office 3,474,260
Patented Oct. 21, 1969

3,474,260

TIME DOMAIN EQUALIZER USING ANALOG SHIFT REGISTER

Hugh F. Frohbach, Sunnyvale, Calif., assignor to South Pacific Company, San Francisco, Calif., a corporation of Delaware Filed Oct. 10, 1966, Ser. No. 585,530
Int. Cl. G11c *19/00*
U.S. Cl. 307—221 7 Claims

ABSTRACT OF THE DISCLOSURE

An analog shift register comprises a plurality of shift register stages each of which has two transistors which have a diode connected between the collector of one transistor and the emitter of the following transistor. Two buss lines are provided having a first capacitor connected between one of the buss lines and the emitter of one transistor and the second capacitor connected between the second buss line and the emitter of the succeeding transistor. All transistor bases are connected to ground. A negative and positive pulse simultaneously applied to the two buss lines to effectuate shifting of an analog signal which is applied to the input of the shift register.

This invention relates to equalizing filters and more particularly to improvements in time domain equalizing filters.

A problem often encountered in attempting to transmit sampled data information over conventional lines is distortion caused by the nonuniform amplitude and phase delay characteristics of the line with frequency. These nonuniformities may be compensated for, to a large extent, by equalization using filters whose characteristics are best described in the frequency domain. A more flexible (and in many respects, a more easily adjusted) type of equalization filter has characteristics which are best described in the time domain.

The fundamental equalization problem, in the case of sampled data transmission, is to adjust the overall response of the system so that the instantaneous values of the received signal at regularly spaced "sampling times" correspond to those at the transmitter. In particular, if a single pulse is transmitted, it is desired to have the equalized signal at the receiver pass through zero at all sampling instants except one. The values of the signal at times other than the sampling instants are (theoretically) unimportant. A sample-and-hold circuit operating on the equalized signal can recreate the original single pulse which was transmitted, ignoring the immaterial values between sampling points. If the transmission system is linear, then the ability to transmit a single pulse in this manner implies that any regular train of variable amplitude pulses at the sampling rate will be reproduced properly at the receiver.

The typical and conventional time domain equalizing filter usually comprises a delay line having a plurality of taps therealong. The signal to be equalized is applied to one end of the tapped delay line. Each one of the taps is connected usually to a potentiometer so that the weighting to be given to the signal appearing at the tap may be established. The potentiometer outputs may be applied directly or through an inverting network to a summation circuit. The output of the summation circuit is a weighted linear sum of the signals appearing at the taps of the delay line where the weights may be either positive or negative. For proper equalization, the time delay between the taps can be any time equal to or shorter than the time between sampling instants. However, the weighting potentiometer is more easily adjusted if the time between taps is made exactly equal to the time between samples. The amount of correction possible with this type of equalizer is restricted only by its length. The original train of variable amplitude pulses is recreated by sampling the corrected waveform and retaining the instantaneous value which occurs at the sampling instants. The sampling instants are made synchronous with those which occur at the transmitter.

Some of the disadvantages of the type of filter generally described above, are that if long delays are required between taps, especially at audio frequencies, it is necessary to use large inductances and capacitors, which besides being objectionable because of their size, are also expensive. Also, if it is desired to vary the delay between taps, this is most difficult since unless special provisions are made for sliding a tap along a delay line in the manner of a wire wound potentiometer, this normally cannot be done. The slidable or adjustable tap delay line is expensive. Finally, there is attenuation which occurs to the current flowing through the delay line due to the resistance of the delay line.

An object of this invention is to provide a novel construction for a time domain filter in which the deficiencies of the inductance type of delay line are eliminated.

Another object of the present invention is to provide a novel analog shift register, suitable for use in a time domain equalization filter.

These and other objects of this invention may be achieved by providing a network which replaces the tapped delay line portion of the filter. This network comprises what may be called an analog shift register. A stage of the shift register will comprise two transistors which have a diode connected between the collector of one transistor and the emitter of the following transistor. Two bus lines are provided. A first capacitor is connected between one of the bus lines and the emitter of the one transistor and a second capacitor is connected between the second bus line and the emitter of the succeeding transistor. The bases of all the transistors are connected to ground.

A sample of an analog signal is applied to the first capacitor connected to the emitter of the first transistor. This signal is shifted to the second capacitor by applying opposite polarity pulses simultaneously to both bus lines. The polarities of the applied analog signal and the opposite polarity shift pulses are such that there is a current flow through the first transistor and through the second capacitor which charges up the second capacitor with the same amplitude charge as existed on the first capacitor while the charge on the first capacitor is reduced to zero. Another oppositely poled pair of pulses is applied to the bus line which causes the charge in the second capacitor to be shifted to the third capacitor of the succeeding shift register stage. After this, a new analog sample may be applied to the first capacitor.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
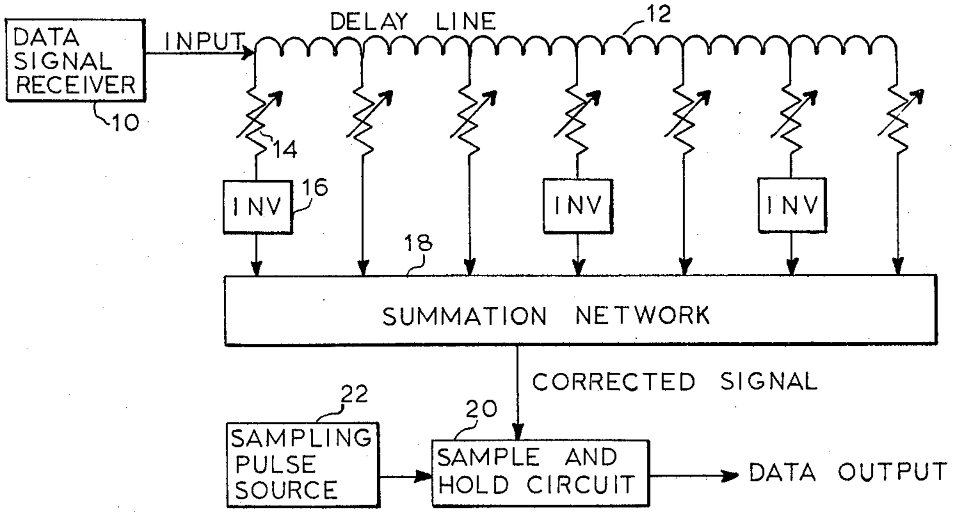
FIG. 1 PRIOR ART
FIGURE 1 is a schematic diagram of the conventional time domain equalization filter.

Referring now to FIGURE 1, there may be seen a schematic representation of a conventional time domain equalizing filter. This is being presented and described in order to afford a better appreciation of this invention. The analog data signals which are to be equalized are applied by a receiver 10, to the filter which includes a tapped delay line 12, variable attenuators 14, each of which is connected to a different one of the taps on the delay line, and if inversion is required, these are connected in turn to the respective inverters 16. The direct output from the attenuator, which usually are potentiometers, or the outputs from the inverters, are applied to a summation network 18. This network produces a sum of all of the signals applied to it and applies this sum to a sample-and-hold circuit 20. Sampling pulses 22, from a source, are applied to the sample-and-hold circuit for the purpose of gating an output therefrom, which output comprises the sampled data output which has been corrected by the equalizing filter.

The sampling pulses are usually received from the transmitter along with the data signals. The delay line serves to pass the received signals past the taps and the amount of the signal existing at each of the taps to be applied to the summation network is determined by the settings of the various adjustable attenuators. There are set to compensate for the effects of any preceding circuits on the waveshape so that compensation is made for distortion. The summation network applies the resultant signals to the sample-and-hold circuit where they are gated out by pulses from the source of sampling pulses. The data output signal from the sample-and-hold circuit presumably is a replica of the signal which was sampled at the transmitter.

Figure 2:
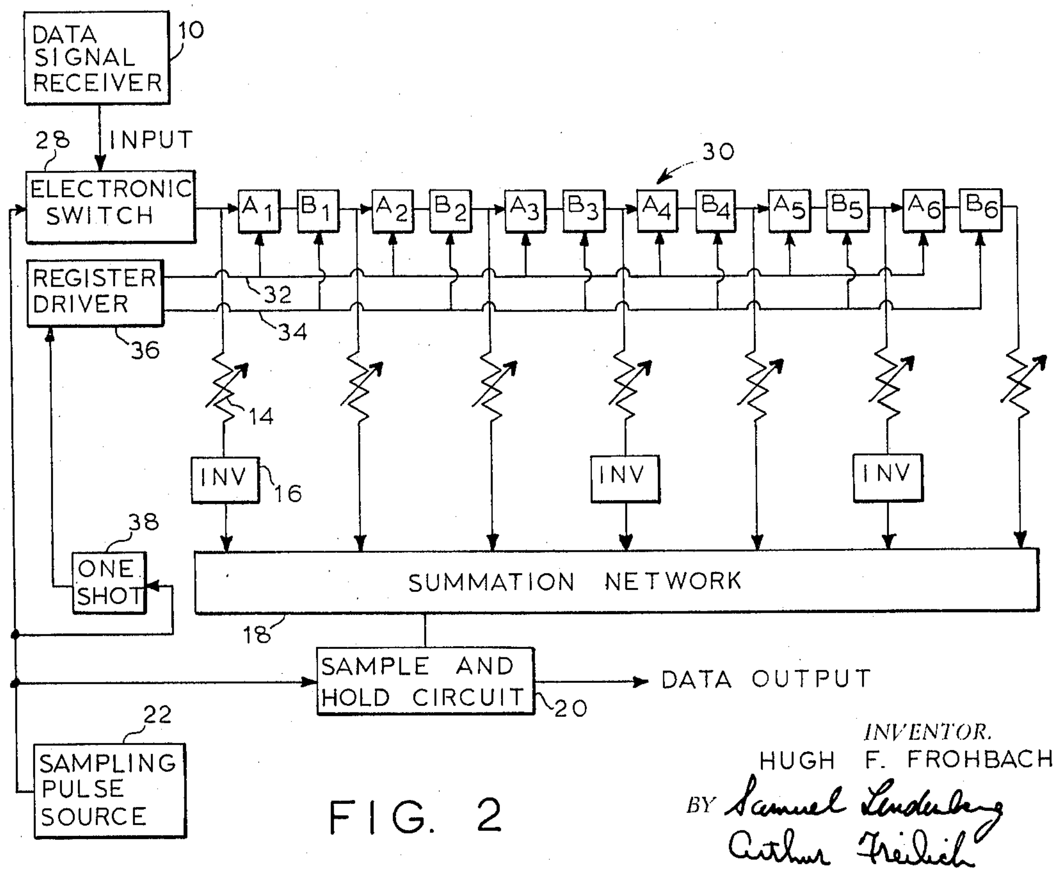
FIGURE 2 is a block schematic diagram of the time domain equalizing filter using an analog shift register in accordance with this invention.

FIGURE 2 is a schematic diagram of a time domain equalizing filter in accordance with this invention. The structure which functions similarly to the structure shown and described in FIGURE 1 bears the same reference numerals. The data signals from the receiver 10 are gated through an electronic switch 28 in response to sampling pulses from the source 22, into an analog shift register 30. The analog shift register comprises two sections per stage respectively designated as A1, B1, A2, B2 . . . A*n*, B*n*. Signals which are introduced into the A1 section are shifted along the register in response to opposite polarity pulses applied to two bus lines 32, 34, simultaneously. The bus line 32 connects to all the A shift register sections and the bus line 34 connects to all the B shift register sections.

A register driver 36 provides the opposite polarity pulses required for causing the register to perform the shift operation. A one shot multi-vibrator 38, which is driven in response to a sampling pulse, actuates the register driver 36 each time the shift operation is to be performed. The timing of the arrangement is that a sampling pulse opens the electronic switch so that a received data signal can be transferred to the A1 section of the shift register. The one shot multivibrator 38 delays the application of an enabling pulse to the register driver 36 long enough for the sampling pulse to terminate, at which time the electronic switch is closed. Thereupon the register driver applies a pair of shift pulses to the two busses 32, 34. After the shift operation is completed, the next sampling pulse comes along and the cycle is repeated. The attenuators 14 are connected to the input to the analog shift register into the B output of each stage of the shift register. The operation of the attenuators and/or inverters as well as the summation network 18 and the sample-and-hold circuit 20, is the same as was described previously.

Figure 3:
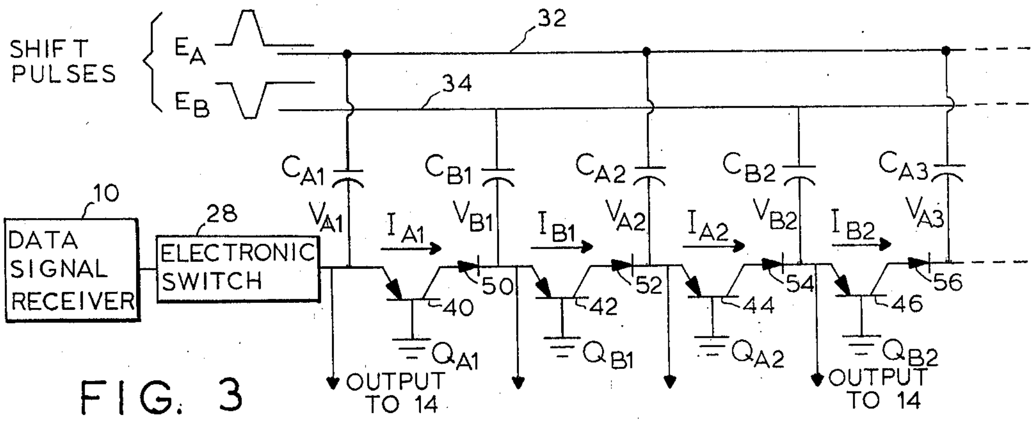
FIGURE 3 is a schematic diagram of an analog shift register in accordance with this invention.

FIGURE 3 is a circuit diagram of two stages of an analog shift register in accordance with this invention. The bus 32 which is connected to all the A sections actually connects to capacitors designated as $C_{A1}$, $C_{A2}$, $C_{A3}$ . . . $C_{An}$. The bus 34 connects to capacitors respectively designated as $C_{B1}$, $C_{B2}$ . . . $C_{Bn}$. There is a common transistor respectively 40, 42, 44, 46 . . . *n*, for each stage of the shift register. By way of example, these transistors are shown as NPN transistors, PNP transistor may also be used herewith, due attention being given to signal polarities. The emitter of each one of the respective transistors 40, 42, 44, 46 is respectively connected to the preceding capacitor or capacitor of the preceding section. The collector of the respective transistors are respectively connected through diodes respectively 50, 52, 54, 56, to the emitter of the succeeding transistor as well as to the capacitor in the succeeding section. Thus, by way of example, transistor 42 has its emitter connected to the capactior $C_{B1}$ and to the diode 50. Its collector is connected to a diode 52, which in turn is connected to the capacitor $C_{A2}$ and to the emitter of transistor 44. The base of each one of the transistors is connected to ground.

Figure 4:
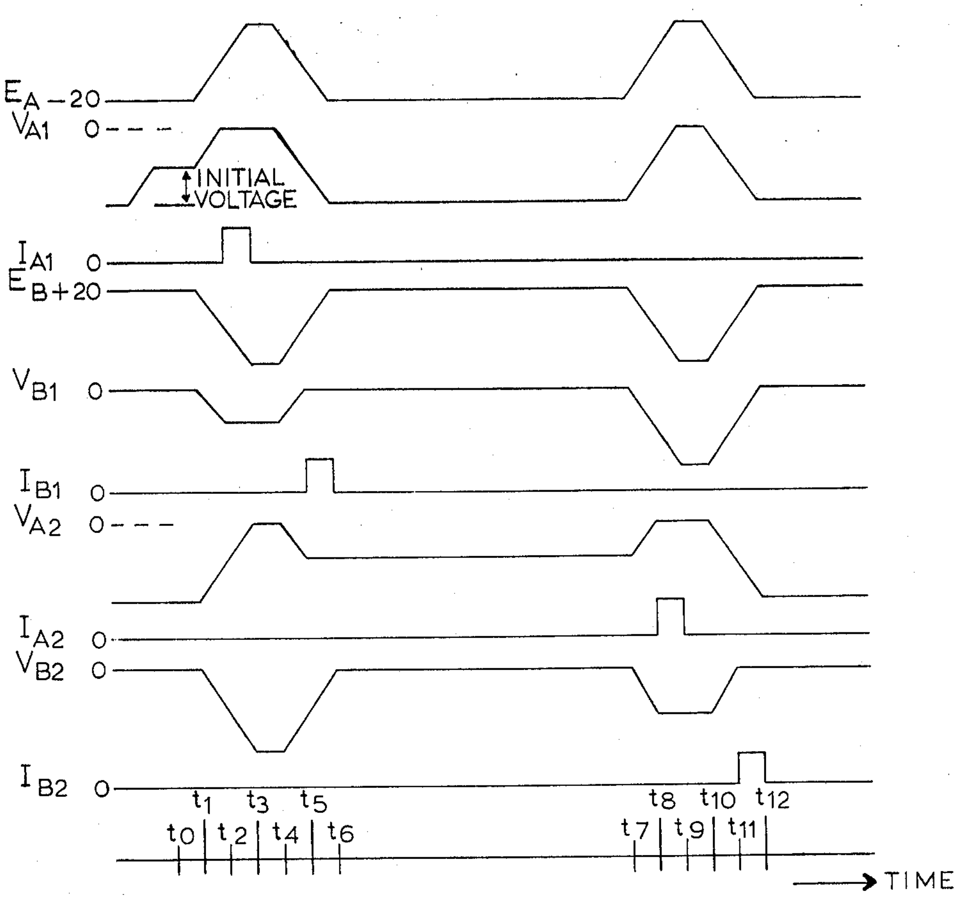
FIGURE 4 is a diagram of waveforms which occur in the course of the utilization of the analog shift register.

Assume that the electronic switch is closed whereby a received data signal at time $t_0$, as shown in FIGURE 4, is enabled to charge up capacitor $C_{A1}$ to a value $V_1$ as shown in FIGURE 4 in waveform $V_{A1}$. The electronic switch 28 is then opened, and at time $t_1$, shift pulses from the register driver 36, having the opposite polarity waveforms $E_A$ and $E_B$, are simultaneously applied to the respective busses 32 and 34. As the voltage $E_A$ increases, a point is reached (at $t_2$) where the transistor 40 emitter starts to go positive. However, it is prevented from doing so by the emitter-base junction of transistor 40. From this point until $E_A$ reaches its maximum at time $t_3$, charge flows from capacitor $C_{A1}$ at constant current $I_{A1}$ through the transistor 40, through the diode 50, into capacitor $C_{B1}$. Since the other terminal of $C_{B1}$ is being driven by a voltage having the waveform $E_B$, the voltage across the capacitor $C_{B1}$ follows $E_B$ in the absence of current, and without current, would reach a maximum excursion equal to that of $E_B$. When charge is transferred through the transistor however, the voltage $V_{B1}$ across the capacitor $C_{B1}$, differs from $E_B$ in an amount proportional to the charge transferred. Thus, after the first step of the two-step transfer cycle, i.e., at $t_3$, the voltage on $C_{B1}$ is a linear function of the voltage originally on $C_{A1}$. The second part of the cycle is shown beginning at $t_4$. During this part of the cycle, the charge deposited in $C_{B1}$ is transferred through transistor 42 to capacitor $C_{A2}$ in a manner exactly analogous to the first part of the cycle. The diode 50 prevents the charge from leaking back through the collector of transistor 40. The charge transfer and the second step are thus completed at $t_6$. Another two-step transfer cycle is shown from the time $t_7$ through $t_{12}$. Waveforms $V_{B1}$ and $V_{B2}$ can be considered as two successive outputs of the analog shift register derived from $C_{B1}$ and $C_{B2}$.

The recharging of $C_{A1}$ to a new voltage level in response to the input signal would occur between $t_6$ and $t_7$. For simplicity, however, the waveforms have been drawn with this recharging step omitted.

The operation of the analog shift register may be briefly summarized by stating that the opposite polarity shift pulses which are brought into the shift register serve the function of placing the transistors in a condition for conduction whereby charges are transferred from a capacitor connected to the emitter of a transistor to the capacitor connected to the collector. A trapezoidal waveshape is employed for securing the transfer with the result that the charge on the first capacitor is transferred through the transistor to the second capacitor of a stage on the front edge of the shift pulse waveform and thereafter, on the trailing edge of the waveform is transferred to the first capacitor of the succeeding stage of the shift register.

Each output of the analog shift register is a train of trapezoidal pulses having an amplitude proportional to the received signal at the instants of sampling. Pulses from all the outputs of the shift register are synchronous and represent the received signal delayed by differing amounts. Conventional phase splitters may be used to provide a choice of signal polarity for each output, and the weighting and summation process may be done conventionally by potentiometers as described.

It should be appreciated that the advantages of using a capacitive analog shift register type of delay line over the conventional tapped inductance-capacitance delay line are first, that long delays per tap may be obtained without using large inductances and capacitances whereby a cost saving, especially at audio frequency, is obtained. The delay is determined solely by the time between shift pulses, so that the delays between stages may be easily varied for experimental purposes. Still another advantage is that the effective delay line operation is nondispersive; that is, the delay per stage is the same at all frequencies of input signal. Since the analog levels which are derived are in pulse form, they may be amplified and combined using relatively short time constant AC coupling and clamps to restore the DC. Finally, the circuit can be designed for no attenuation; that is, the loss of charge due to the base currents of the transistors and the phase splitters used at the outputs may be compensated for by using smaller storage capacitors in the later stages of the shift register.

There has accordingly been described and shown a novel, useful and unique analog delay line suitable for use in a time domain equalizing filter.

What is claimed is:

1. An analog shift register comprising:
a plurality of shift register stages, each stage including first and second capacitors and first and second transistors, each transistor having an emitter, collector and base electrode;
each stage further including means coupling one end of the first capacitor to the emitter of the first transistor;
means coupling one end of the second capacitor to the collector of said first transistor;
means coupling said one end of said second capacitor to the emitter of said second transistor; and
means coupling the collector of said second transistor to the first capacitor of a succeeding stage;
means connecting together the bases of all of said transistors;
means for applying an analog signal to the first capacitor in the first stage of said register; and
means for simultaneously applying a first pulse of one polarity to all of the first capacitors' other ends and a second pulse of polarity opposite to that of said first pulse to all of the second capacitors' other ends for transferring said analog signal along said shift register.

2. An analog shift register as recited in claim 1 wherein each said means for coupling the second capacitor to the collector of a first transistor comprises:
a diode; and
said means for coupling the collector of a second transistor to the first capacitor in a succeeding stage comprises another diode.

3. An analog shift register as recited in claim 3 wherein said means for applying a first pulse to the other ends of all of said first capacitors and a second pulse to the other ends of all of said second capacitors includes a first bus line connected to all of the other ends of said first capacitors and a second bus line connected to all of the other ends of said second capacitors.

4. Apparatus as recited in claim 1 wherein said means for applying a first pulse to all of the other ends of said first capacitors and a second pulse to all of the other ends of said second capacitors includes means for applying opposite polarity first and second pulses having trapezoidal waveforms.

5. An analog shift register comprising:
a plurality of shift register stages, each stage including:
a first capacitor;
a second capacitor;
means for charging said first capacitor with a charge representative of an analog signal;
means for applying a first pulse having one polarity to all of said first capacitors' one ends for charging said first capacitor and simultaneously applying a second pulse of an opposite polarity to said one polarity to all of said second capacitors' one ends for charging said second capacitor,
first means coupling said other end of said first capacitor to the other end of said second capacitor in a stage for transferring the charge in said first capacitor to said second capacitor responsive to the application of said first and second pulses; and
means coupling a second capacitor in a stage to the first capacitor in a succeeding register stage for transferring the charge received by said second capacitor to the first capacitor of said succeeding stage responsive to the application of said first and second pulses.

6. In a time domain equalizing filter of the type wherein analog sample signals are applied to one end of a delay means having a plurality of taps therealong, and a separate attenuator is connected to each of said taps, and the outputs of said separate attenuators are connected to a summing network, the output of which is sampled to produce a corrected signal, the improvement in said delay means comprising:
an analog shift register having a plurality of stages connected in series, each stage including a first and a second capacitor;
means for applying a sampled analog signal to the first capacitor of a first stage of said shift register;
means for simultaneously applying a first pulse of one polarity to one end of all of the first capacitors in said shift register together with a second pulse of an opposite polarity to said first pulse to one end of all the second capacitors in said shift register for simultaneously charging said first and second capacitors with said opposite polarity pulses;
first transistor means connected between the other ends of the first and second capacitors in a register stage for transferring the charge in said first capacitor to said second capacitor responsive to said first and second pulses; and
second transistor means coupling the other end of each second capacitor in a register stage to the other end of a first capacitor in a succeeding register stage for transferring the charge in said second capacitor to said first capacitor of said succeeding register stage responsive to said first and second pulses.

7. An improved time domain equalizing filter as recited in claim 6 wherein said first transistor means comprises a transistor having emitter, base and collector electrodes;
means connecting said emitter electrode to said other end of said first capacitor;
a diode connected between the collector and said other end of said second capacitor;
said second transmistor means includes a transistor having emitter, base, and collector electrodes;
means connecting the emitter of said second transistor to the other end of said second capacitor;

a second diode connected between said second transistor, collector and the other end of the first capacitor in the succeeding register stage; and means connecting the base electrode of said first and second transistors together.

References Cited

UNITED STATES PATENTS

| | | | |
|---|---|---|---|
| 3,185,864 | 5/1965 | Amodei et al. | 307—221 |
| 3,252,009 | 5/1966 | Weimer | 307—221 |
| 3,258,614 | 6/1966 | Burlak | 307—221 |
| 2,921,738 | 1/1960 | Greening | 328—37 |
| 3,172,043 | 3/1965 | Altman | 328—55 |
| 3,289,010 | 11/1966 | Bacon et al. | 307—221 |
| 3,333,110 | 7/1967 | Schanne | 307—293 |

JOHN S. HEYMAN, Primary Examiner

U.S. Cl. X.R.

307—293

UNITED STATES PATENT OFFICE

CERTIFICATE OF CORRECTION

Patent No. 3,474,260 October 21, 196!

Hugh F. Frohbach

It is certified that error appears in the above identified patent and that said Letters Patent are hereby corrected as shown below:

In the heading to the printed specification, lines 4 and ! "South Pacific Company" should read -- Southern Pacific Compan) --.

Signed and sealed this 20th day of October 1970.

(SEAL)
Attest:

Edward M. Fletcher, Jr.
Attesting Officer

WILLIAM E. SCHUYLER, J]
Commissioner of Patent